United States Patent [19]

Eisenberg

[11] 4,148,977

[45] Apr. 10, 1979

[54] GALVANIC CELL EMPLOYING COPPER ORE ACTIVE CATHODE MATERIALS

[75] Inventor: Morris Eisenberg, Mountain View, Calif.

[73] Assignee: Electrochimica Corporation, Mountain View, Calif.

[21] Appl. No.: 889,036

[22] Filed: Mar. 22, 1978

[51] Int. Cl.$^2$ .............................................. H01M 6/14
[52] U.S. Cl. .................................... 429/194; 429/220
[58] Field of Search ................ 429/194, 197, 103, 220

[56] References Cited

U.S. PATENT DOCUMENTS 3,639,174  2/1972  Kegelman ............................ 429/194

Primary Examiner—Charles F. Lefevour
Attorney, Agent, or Firm—Robert B. Kennedy

[57] ABSTRACT

A galvanic cell wherein the active cathode material is a simple or complex copper sulfide constituent of copper ore, copper concentrate, a matte or other intermediate material in the ore beneficiation or metal winning or refining process.

3 Claims, No Drawings

GALVANIC CELL EMPLOYING COPPER ORE ACTIVE CATHODE MATERIALS

BACKGROUND OF THE INVENTION

This invention relates to the use of sulfide-type copper ores, whether or not they have been beneficiated and concentrated, as electrochemically active ingredients in primary (non-rechargeable) and secondary (rechargeable) batteries employing aqueous or non-aqueous electrolytes, the latter including high temperature molten salt batteries.

In the search for substantially lower cost materials for the construction of electrochemical batteries, both primary and secondary, it has been discovered that copper ores containing either copper-sulfur compounds or copper iron-sulfur compound, with or without the presence of other metal sulfides or oxides, can be used as cathode active materials for both primary and secondary batteries using a variety of electrolyte systems. The removal of silica and silicates is desirable simply to reduce the bulk of the material to improve its electrical conductivity in the cathode mix. For this reason it is desirable, although not absolutely necessary, to employ ore concentrates from which silica and silicates have been removed by flotation and other processes. These concentrates still contain significant amounts of iron, silica and alumina.

Typical copper concentrate may contain 27% by weight of copper, 26% copper metal, 22% iron metal, 24.5% sulfur, 2.6% alumina, 0.3% calcia, 12.3% silica and 17.4% insolubles. The metal ore present simple or complex sulfides. A typical compound makeup of these concentrates can be 75% chalcopyrite ($CuFeS_2$), 15% iron pyrite ($FeS_2$), 1-2% bornite, 1% molybdenite and the usual silica, etc. In the copper refining process this material is fed into a smelter which upgrades the contents of copper and a "matte" is produced as an intermediate with a typical composition of 45% copper 24% iron and 25% sulfur.

Copper, iron, and sulfur form a large variety of compounds with various stoichiometric ratios. Extensive phase diagrams in this system have been described by R. A. Yund and G. Kullerud (J. Petrology 1966 Vol. 7 pp. 454–88). Typical compounds occurring in naturally found ores of the three elements are chalcopyrite ($CuFeS_2$), bornite ($Cu_5FeS_4$), and cubanite ($CuFe_2S_3$), and idaite ($Cu_5FeS_6$). These formulas are of course normal compositional expressions. In reality there is a compositional range for elements within a given compound structure particularly for the sulfur. Very often in nature, chalcopyrite is found with compositions $CuFe_2S_x$ where x may vary from 1.6 to 2.0.

SUMMARY OF THE INVENTION

It has now been discovered that such sulfide based ores or concentrates can be used with all their naturally occuring metal impurities (such as iron sulfides and pyrites) directly for preparation of the cathode mix to be employed in the construction of positive plates for batteries. This approach represents a very large reduction in the cost of such batteries compared with the use of refined and specifically prepared chemicals.

This invention covers copper-sulfur ore minerals and compounds occurring in nature in various ratios such as in digenite (often designated as $Cu_2S$ or $Cu_9S_5$ or $Cu_7S_4$), covellite (CuS) or compounds of copper and iron with sulphur; e.g. calcopyrite ($CuFeS_2$), bornite ($Cu_5FeS_4$), or others.

It has also now been discovered that impurities of other metals or oxides do not very significantly lower the performance of our cathode materials.

It has further been now discovered that a good copper ore such as containing predominatly chalcopyrite can be used as a cathode active material in batteries by appropriate processing as described in the examples below. Impurities containing simple metal sulfides, such as iron-pyrite ($FeS_2$) are not a problem since we have found that they too are electrochemically active as cathode materials and are not a detriment, except for a possible slight reduction of the cell voltage. Impurities, such as silica, alumina, calcia, etc., we have found, are inert and not detrimental. They merely volumetrically decrease the effectiveness of the cathode material. They also reduce the effective conductivity of the cathode mix. Therefore, it is desirable to use materials in which these impurities have been reduced or eliminated. Therefore, flotation, beneficiation processes and smelting processes which are normally used to upgrade the ore are also desirable for our purpose, although not absolutely necessary.

DESCRIPTION OF THE PREFERRED EMBODIMENTS

EXAMPLE 1

A copper ore containing approximately 56% chalcopyrite was ground in a ball mill with water as a thick slurry for 24 hours, dried, and the material sieved to collect a fraction of minus 80 plus 325 mesh. This material was used to make a cathode mix containing 20% graphite, 5% teflon binder and the balance the ore. The mix was pressed to a 20 mesh copper screen 2 in. $\times$ 2 in. in size. The resulting cathode was discharged between 2 sheets of magnesium type AZ-10 using a 1.5 molar solution of magnesium perchlorate in water. A current of 30 milliamps was drawn from this cell.

EXAMPLE 2

The same cathode mix from Example 1 was pressed to an expanded nickel grid 7-3/0 mesh. The cathodes were assembled into a cell using a polypropylene separator between 2 lithium anodes in a glass cell inside an argon dry box. The cell was filled with a non-aqueous 1.5 molar solution of lithium perchlorate in tetrohydrofuran. The battery was discharged at the current density of 1 mA/cm$^2$ of surface area with an initial voltage of 2.1 volts down to an end voltage of 1.1 volts.

EXAMPLE 3

A copper concentrate was used of the following composition: 27% copper, 21% iron, 24% sulfur, and the remainder silica and other inerts. After grinding and drying a size, a fraction of minus 60 plus 325 mesh was used to make a cathode mix containing also 15% graphite added to increase conductivity and 7½% teflon as a binder. A 1 in. $\times$ 1 in. cathode was pressed on a supporting expanded nickel grid and used between 2 lithium anodes of the same size in an experimental glass cell in a dry box with a polypropylene separator and an electrolyte containing a 2.0 molar solution of lithium perchlorate in a mixture of 70% by volume tetrohydrofuran and 30% by volume dimetroxyethane. In the first discharge between 2.1 and 1.1 volts, this cell delivered a capacity equivalent to 220 mAH per gram of ore concentrate used in the cathode mix. Following this, the cell was charged up with a starting voltage of approximately 1.5 volts and an ending voltage of 2.4 volts using a 10% capacity input excess. The discharge and charge cycle was repeated 18 times.

EXAMPLE 4

Chunks of a copper matte with a weight composition of 45% copper, 25% iron, and 25% sulfur were reduced by grinding to a mesh range of minus 60 plus 325 and a cathode mix prepared and pressed to a nickel grid as in the previous example. A 1 in.×1 in. cathode was again placed between lithium anodes in a glass cell and discharged in the cell using the electrolyte from example 3 and a current density of 1 mA/$Cm^2$ to a capacity yield of 310 mAH/g to a 1.0 volt cathode. The cell was recharged with a 10% excess capacity input at a current density of 0.3 mA/$Cm^2$. The cycle was repeated 12 times.

It should be understood that the just described examples merely illustrate preferred forms of the invention. Many modifications, additions and deletions may, of course, be made thereto without departure from the spirit and scope of the invention as set forth in the following claims.

I claim:

1. In a galvanic cell having a cathode, an anode and an electrolyte, the improvement comprising the active cathode material being a simple or complex copper sulfide compound contained in a copper ore whether in a natural form, in a concentrated form with at least some silica or silicate removed, or in a smelter producing matte form.

2. A galvanic cell in accordance with claim 1 in which the ore contains copper in the form of compounds selected from the group consisting of digenite, covellite, chalcopyrite, bornite, cubanite, idaite, and mixtures thereof.

3. A galvanic cell in accordance with claims 1 or 2 in which the anode is lithium and the electrolyte contains a lithium salt in an aprotic solvent or mixtures thereof.